(12) United States Patent
Ba et al.

(10) Patent No.: US 12,325,190 B2
(45) Date of Patent: Jun. 10, 2025

(54) REAL-TIME MONITORING OF ADDITIVE MANUFACTURING

(71) Applicant: International Business Machines Corporation, Armonk, NY (US)

(72) Inventors: Amadou Ba, Navan (IE); Joern Ploennigs, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 17/099,153

(22) Filed: Nov. 16, 2020

(65) Prior Publication Data

US 2022/0152935 A1  May 19, 2022

(51) Int. Cl.
B29C 64/393 (2017.01)
B33Y 50/02 (2015.01)
G06T 7/00 (2017.01)
G06T 19/00 (2011.01)

(52) U.S. Cl.
CPC ............ B29C 64/393 (2017.08); B33Y 50/02 (2014.12); G06T 7/001 (2013.01); G06T 19/006 (2013.01); G06T 2207/30164 (2013.01)

(58) Field of Classification Search
CPC ..... B29C 64/393; G06T 7/001; G06T 19/006; G06T 2207/30164
See application file for complete search history.

(56) References Cited

U.S. PATENT DOCUMENTS

| | | | |
|---|---|---|---|
| 9,108,358 B1 | 8/2015 | Herloski et al. | |
| 9,632,037 B2 | 4/2017 | Chen et al. | |
| 9,724,876 B2 | 8/2017 | Cheverton et al. | |
| 9,999,924 B2 | 6/2018 | Dave et al. | |
| 10,421,267 B2 | 9/2019 | Reese et al. | |
| 2015/0064047 A1 | 3/2015 | Hyde et al. | |

(Continued)

FOREIGN PATENT DOCUMENTS

| | | |
|---|---|---|
| CN | 106863784 A | 6/2017 |
| EP | 2797730 B1 | 8/2016 |

(Continued)

OTHER PUBLICATIONS

Malik et al., "An Application of 3D Model Reconstruction and Augmented Reality for Real-Time Monitoring of Additive Manufacturing," https://www.sciencedirect.com/science/article/pii/S2212827119303658, Procedia CIRP 81 (2019) 346-351. (Year: 2019).*

(Continued)

*Primary Examiner* — Darrin D Dunn
*Assistant Examiner* — Yvonne Trang Follansbee
(74) *Attorney, Agent, or Firm* — Robert D. Bean (57) ABSTRACT

Provided is a method for monitoring additive manufacturing. The method comprises acquiring an image of a three-dimensional object that is being constructed using an object model. The method further includes isolating a layer of the three-dimensional object from the image. The method further includes generating a three-dimensional model from the layer. The method further includes comparing the three-dimensional model with the object model. The method further includes identifying a discrepancy between the three-dimensional model and the object model. The method further includes providing a notification of the identified discrepancy.

20 Claims, 6 Drawing Sheets

(56) References Cited

U.S. PATENT DOCUMENTS

| | | | |
|---|---|---|---|
| 2015/0165683 A1* | 6/2015 | Cheverton | B29C 64/124 |
| | | | 382/141 |
| 2016/0185048 A1 | 6/2016 | Dave et al. | |
| 2017/0001379 A1 | 1/2017 | Long | |
| 2017/0310935 A1* | 10/2017 | Sinclair | B29C 64/245 |
| 2018/0043634 A1* | 2/2018 | Sands | B33Y 50/00 |
| 2018/0297115 A1 | 10/2018 | Diwinsky et al. | |
| 2019/0102815 A1* | 4/2019 | Norman | G06Q 30/06 |
| 2019/0329498 A1 | 10/2019 | Wasmer et al. | |
| 2019/0384274 A1 | 12/2019 | Bharadwaj et al. | |
| 2020/0096970 A1 | 3/2020 | Mehr et al. | |
| 2020/0215761 A1* | 7/2020 | Chen | B33Y 70/10 |
| 2021/0170690 A1* | 6/2021 | Gupta | G06K 19/06028 |
| 2022/0042924 A1* | 2/2022 | Beckett | G05B 19/41875 |

FOREIGN PATENT DOCUMENTS

| | | |
|---|---|---|
| EP | 3170591 A1 | 5/2017 |
| KR | 101974722 B1 | 12/2018 |
| WO | 2017165436 A1 | 9/2017 |

OTHER PUBLICATIONS

Malik et al., "An Application of 3D Model Reconstruction and Augmented Reality for Real-Time Monitoring of Additive Manufacturing," https://www.sciencedirect.com/science/article/pii/S2212827119303658, Procedia CIRP 81 (2019) 346-351.

Mell et al., "The NIST Definition of Cloud Computing," Recommendations of the National Institute of Standards and Technology, U.S. Department of Commerce, Special Publication 800-145, Sep. 2011, 7 pgs.

Tapia et al., "A Review on Process Monitoring and Control in Metal-Based Additive Manufacturing," Research Gate, article in Journal of Manufacturing Science and Engineering, Dec. 2014, vol. 136, DOI: 10.1115/1.402854, 11 pgs.

* cited by examiner

REAL-TIME MONITORING OF ADDITIVE MANUFACTURING

BACKGROUND

The present disclosure relates generally to the field of additive manufacturing, and more particularly to real-time monitoring of additive manufacturing.

Additive manufacturing refers to manufacturing processes that build or construct a three-dimensional object by repeatedly adding material. One example of additive manufacturing is three-dimensional (3D) printing. In 3D printing processes, layers of material are added atop one another and joined together to build a 3D object. More specifically, a first layer of material is printed, a second layer of material is printed on top of the first layer so as to be joined to a top surface of the first layer, and this process is repeated until construction of the 3D object is complete.

SUMMARY

Embodiments of the present disclosure include a method, computer program product, and system for monitoring additive manufacturing in real-time. The method comprises acquiring an image of a three-dimensional object that is being constructed using an object model. The method further comprises isolating a layer of the three-dimensional object from the image. The method further comprises generating a three-dimensional model from the layer. The method further comprises comparing the three-dimensional model with the object model. The method further comprises identifying a discrepancy between the three-dimensional model and the object model. The method further comprises providing a notification of the identified discrepancy.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of additive manufacturing, and in particular to monitoring of additive manufacturing. While the present disclosure is not necessarily limited to such applications, various aspects of the disclosure may be appreciated through a discussion of various examples using this context.

Additive manufacturing, such as 3D printing, can be accomplished by performing a variety of more specific processes and using a variety of materials. In some additive manufacturing processes, a computer aided design (CAD) model of the object to be built is provided to a printing system, which processes the model. Processing the model may include, without limitation, analyzing the CAD model to determine which materials may be appropriate for constructing the object, designing, modelling, or simulating a build process for constructing the object, and dividing the CAD model into layers to be formed by the printing system. In some additive manufacturing processes, the printing system forms the object by depositing (printing) the appropriate material or materials one layer at a time until the 3D object is complete.

The present disclosure may refer to "printing" as one example of an additive manufacturing process. However, it is to be understood that the present disclosure may be applied to other additive manufacturing processes in addition to or instead of 3D printing. Similarly, the present disclosure may refer to an object being printed as one example of an object constructed by additive manufacturing. However, it is to be understood that the present disclosure may be applied to other objects being constructed by additive manufacturing processes in addition to or instead of objects being printed by 3D printing.

One advantage of additive manufacturing is that less waste is generated as desired material is added rather than undesirable material being removed. This may be particularly advantageous if the object is to be made out of a particularly costly material. Another advantage of additive manufacturing is that complex shapes, including shapes having negative interior spaces, can be constructed more easily than with other manufacturing processes. Another advantage of additive manufacturing is the elimination of further assembly procedures by producing a single, completely constructed object.

One disadvantage of additive manufacturing is that building an object by applying a single layer of material at a time can be time consuming. Accordingly, it is not practical to use additive manufacturing techniques to produce large quantities of objects. In other words, low productivity rates may prevent the use of additive manufacturing in some high-volume production applications.

Another disadvantage of additive manufacturing is that designing a CAD model can require more effort than designing a model for another manufacturing process, like molding, for example. While additive manufacturing can be used to create objects having complex shapes, designing models for such shapes can be challenging. Additionally, applications of such objects, relying on the complexities of such shapes, may increase the care required for designing the model, further increasing the effort required.

Another disadvantage of additive manufacturing is that building an object by applying a single layer of material at a time requires a high level of precision and accuracy to avoid defects. Such defects are costly in terms of time and materials. More specifically, additive manufacturing is not commonly used for objects requiring extremely high levels of precision and accuracy, such as objects used for aerospace or biomedical applications, due to inconsistencies and failures in meeting product and/or industry standards. One factor underlying these inconsistencies and failures is the difficulty of monitoring the construction of the object in real-time. In other words, if a defect or anomaly is not discovered until construction of the object has been completed, resources spent on that object may have been wasted. Accordingly, to reduce such costs, increase the quality and/or yields of resulting objects, and improve additive manufacturing processes relative to other manufacturing processes, it is desirable to monitor the construction of 3D objects in real-time to identify defects quickly. Quickly identifying defects may also result in improved object quality.

In some embodiments of the present disclosure, an artificial intelligence (AI) system can be utilized to inspect the object being constructed. In particular, the AI system can be used to inspect each layer of the object as it is being constructed. Accordingly, in some embodiments of the present disclosure, real-time monitoring of the object as it is being constructed can include utilizing an AI scan-based method. In some embodiments of the present disclosure, real-time monitoring of the object as it is being constructed can include utilizing a virtual environment using augmented reality glasses for improved interaction between the additive manufacturing system and an operator of the additive manufacturing system. In some embodiments of the present disclosure, real-time monitoring of the object as it is being constructed can include generating a layer by layer 3D model reconstruction of both an outer layer and an inner shape of the object. In some embodiments of the present disclosure, real-time monitoring of the object as it is being constructed can include inspection and defect detection by both an AI system and an operator. In some embodiments of the present disclosure, real-time monitoring of the object as it is being constructed can include providing updated information about the build quality of the object and/or information to support decisions regarding defects in the object.

Current limitations of additive manufacturing include the inability to inspect inner layers of an object that is being constructed. Accordingly, time and resources are wasted if defects occur, because such defects are not discovered until the completion of the construction process. The present disclosure provides an efficient way to discover defects in real-time during construction of the object and make informed decisions regarding continued construction of the object. Decisions regarding continued construction of the object may include, for example, stopping construction of the piece and/or adjusting parameters to bring the additive manufacturing process to desired operating conditions. Accordingly, the present disclosure provides efficient monitoring combined with efficient decision-making tools.

Figure 1:
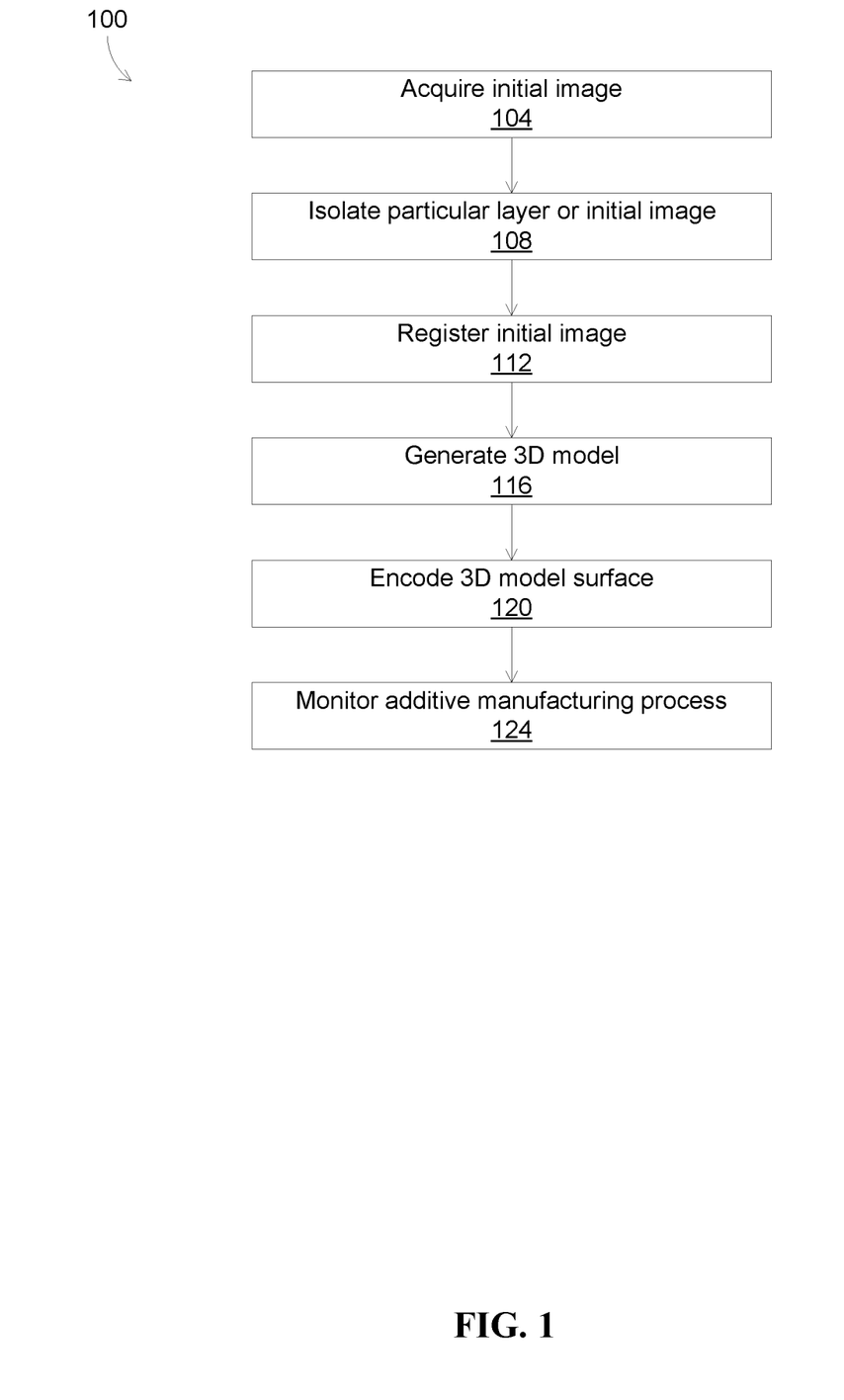
FIG. 1 illustrates a flowchart of an example method for an additive manufacturing and monitoring process, in accordance with embodiments of the present disclosure.

FIG. 1 illustrates an example method 100 of the present disclosure for an additive manufacturing and monitoring process. The method 100 is described in the context of a 3D object being produced by a 3D printing process. However, as noted above, the present disclosure can also be applied to other additive manufacturing processes.

At operation 104 of method 100, an initial image is acquired. More specifically, according to at least some embodiments of the present disclosure, an initial image of the object to be constructed or printed is acquired by a printing system. The initial image may be in the form of, for example, a computer assisted design (CAD) file or a photograph. The initial image may be generated by an external system and received by the printing system or the initial image may be generated by the printing system. The initial image conveys a plan for the object to be constructed. In other words, the initial image may be considered an image of an "idealized" version of the object.

Because the initial image is, inherently, a two-dimensional (2D) representation of the 3D object, information pertaining to the depth dimension is lost. Thus, the printing system applies further processes to compensate for this loss of information in the 2D initial image. In at least one embodiment of the present disclosure, the initial image is a top view of the object.

At operation 108 of method 100, a particular layer of the initial image is isolated. More specifically, according to at least some embodiments of the present disclosure, the printing system isolates the particular layer of the initial image. To isolate the particular layer, the printing system may utilize production information which is included in the instructions for constructing the 3D object. Such production information may also be referred to as an object model. In some embodiments of the present disclosure, the initial image is part of the object model.

As used herein, the term "object model" refers to the idealized model of the 3D object that is provided to the printing system for construction. Thus, the printing system uses the object model to construct the 3D object. Accordingly, the term "object model" refers to intangible code or instructions that are applied by the printing system. In contrast, the term "3D object" refers to the tangible object that is being built by the printing system. Accordingly, in the present disclosure, the 3D object is constructed by the printing system using information provided in the object model. Thus, at operation 108, isolation of the particular layer refers to isolation of information from the object model that corresponds to the particular layer of the 3D object.

In some embodiments of the present disclosure, isolation of the particular layer can be achieved by performing one or more processes known in the area of additive manufacturing. For example, in some embodiments of the present disclosure, G-code can be used to isolate the particular layer of the object. G-code is a known language in which computerized machine tools can be instructed. G-code can be applied to provide information for converting 3D models to 2D images and vice versa. In such embodiments of the present disclosure, the G-code is used to isolate the information pertaining to the particular layer of the object that is depicted in the initial image to return depth information about the depicted object.

At operation 112, the initial image is registered. More specifically, according to at least one embodiment of the present disclosure, the printing system registers the initial image. In particular, the particular layer information acquired during isolation of the particular layer is used as a mask. The mask is aligned with the acquired 2D initial image to compensate for issues that arise during image acquisition. Accordingly, image registration refers to a series of transformations applied to the acquired 2D image to account for several aspects of the environment or context of the image. In this way, information can be gathered to facilitate generation of a 3D model from the initial image. In other words, image registration includes capturing the information of the initial image irrespective of the geometric reservations, scale, shape, position, environment, or orientation of the initial image.

For example, a captured 2D image of a 3D object may have a particular rotation or scale due to the parameters and circumstances in which that image was captured. To avoid problems in interpreting the relevant depth information about the 3D object due to such particularities in the 2D image, the 2D image is registered using the particular layer information from operation 108.

Accordingly, at operation 112, image registration includes capturing information about a 3D object from 2D images to enable generation of the 3D object regardless of particularities of the 2D images that do not arise from anomalies or problems with the 3D object itself but from the inherent limitations of the captured 2D images.

In embodiments of the present disclosure in which an image is acquired for each layer of the object being constructed, a layer corresponding to each image is isolated from the object model, and each image is registered. Accordingly, in such embodiments, image registration also facilitates smooth integration of the information from separate 2D images of the separate layers into a 3D object.

At operation 116, a 3D model of the object to be constructed is generated. More specifically, according to at least one embodiment of the present disclosure, the printing system generates a 3D model of the object to be constructed. In particular, the registered 2D images are converted into a 3D file format, which includes information pertaining to the 3D object. For example, a .obj file format can be used to estimate the geometry of a 3D model from processed 2D images.

Of note, as used herein, the term "3D model" refers to a model of the 3D object that is generated from the 2D images. The "3D model" refers to code or information that pertains to 3D object. In at least some embodiments of the present disclosure, the information is gathered by way of the registered 2D image or images. This is in contrast to the term "object model" which, as noted above, refers to initial code or instructions provided to the printing system for constructing the idealized 3D object. In other words, as used herein, the term "object model" refers to an initial representation of the plan to be used to build a 3D object, and the term "3D model" refers to a 3D file format representation of the 3D object that is generated from 2D images, which may have been provided by the object model.

At operation 120, the surface of the 3D model is encoded. More specifically, according to at least one embodiment of the present disclosure, the printing system encodes the 3D model surface. In particular, the 3D model generated by the performance of operation 116 is encoded into a binary format by assigning the area of each pixel of the previous layers a black color and assigning the area of each pixel of the current layer a gray color. In this way, the printing system is able to distinguish the current layer of the 3D object from the previous layer of the 3D object. Thus, the color pixels, which are generated by encoding the surface of the initial 3D model, provide depth values for the registered 2D images.

At operation 124, the additive manufacturing process is monitored. More specifically, once the 3D model has been generated at operation 116 and the surface of the 3D model has been encoded at operation 120, the 3D object, or the particular layer of the 3D object, is constructed, and this construction is monitored. In other words, after the printing system generates the 3D model and encodes the surface of the 3D model, the printing system can construct the 3D object, or the particular layer of the 3D object, and the monitoring system can monitor this construction. Accordingly, monitoring the additive manufacturing process at operation 124 includes performing the additive manufacturing process. Monitoring the additive manufacturing process is described in further detail below.

In at least some embodiments of the present disclosure, the monitoring system is operatively coupled to the additive manufacturing or printing system. For example, the monitoring system may be electronically coupled to the 3D printing system such that information and files can be shared between the monitoring system and the printing system.

In at least some embodiments of the present disclosure, the monitoring system includes a monitoring device and a monitoring component. The monitoring device can include hardware including, for example, a camera. The monitoring component can include software including, for example, an AI algorithm.

In at least some embodiments of the present disclosure, the monitoring system is integrated into the additive manufacturing or printing system. For example, the additive manufacturing system itself (e.g., a 3D printer) may include one or more sensors (e.g., a camera) used for monitoring the manufacturing process. Additionally, the additive manufacturing system may contain the monitoring component (e.g., an AI algorithm) that is configured to utilize the one or more sensors to monitor the monitor progress of the manufacturing. The monitoring component may be realized as hardware, firmware, software (e.g., executing on a processor), or any combination thereof.

Figure 2:
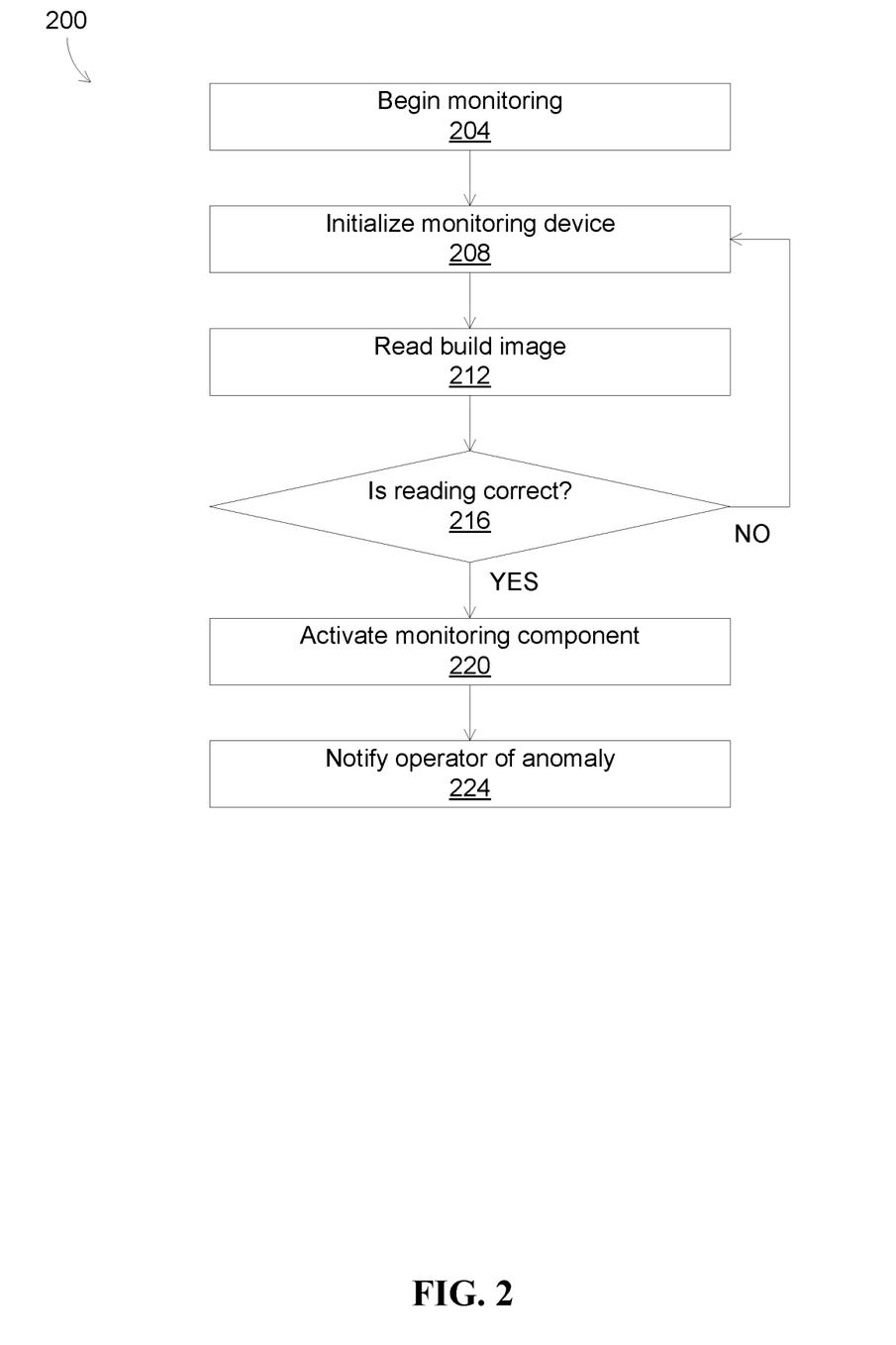
FIG. 2 illustrates a flowchart of an example method for monitoring the additive manufacturing process, in accordance with embodiments of the present disclosure.

FIG. 2 depicts an example method 200 of the present disclosure for monitoring the additive manufacturing process according to at least one embodiment of the present disclosure. In the present example, the additive manufacturing process is a printing process. However, as mentioned above, in alternative embodiments, the additive manufacturing process may be a process other than a 3D printing process. As discussed in further detail below, monitoring the printing process includes providing real-time process result information to a user, thereby enabling the user to make efficient decisions regarding the process.

The method 200 begins with operation 204, wherein the monitoring of the additive manufacturing, or printing process, begins. More specifically, a monitoring system monitors the additive manufacturing process. As mentioned above, the monitoring system is operatively coupled to the system performing the additive manufacturing process such that information and files can be shared between the monitoring system and the printing system. As mentioned above, the monitoring system includes a monitoring device and a monitoring component. In embodiments of the present disclosure, the monitoring system may include one or more than one monitoring device and one or more than one monitoring component.

At operation 208, the monitoring device is initialized. The monitoring device can include one or more hardware devices such as, for example, the camera which is used to capture the images of the object being constructed. In some embodiments of the present disclosure, the monitoring device may additionally or alternatively include other hardware devices such as, for example, augmented reality glasses or mixed reality glasses, which are configured for use with the monitoring system.

At operation 212, a build image is read by the monitoring system. In at least one embodiment of the present disclosure, the build image is captured by the monitoring device. For example, the monitoring device can include a camera mounted above the 3D printer which captures a top view of the 3D object as the 3D object is being built. In at least one alternative embodiment of the present disclosure, the build image is captured by an external system and received by the monitoring system. Accordingly, in at least one embodiment of the present disclosure, reading the build image includes acquiring the build image.

The build image is captured at a time during the ongoing construction of the 3D object. Accordingly, the build image captures the 3D object in a partially constructed state. In other words, the build image captures the 3D object after a particular layer of the object has been constructed and before a subsequent layer of the object has been constructed. In at least some embodiments of the present disclosure, a build image is generated after each layer is constructed. Accordingly, in such embodiments, a build image will correspond to each layer of the object. In some embodiments, the build image is captured during addition of a particular layer (e.g., after the layer has begun to be deposited, but prior to completion of the layer).

In at least some embodiments of the present disclosure, reading the build image can include operations substantially similar to operations 108, 112, 116, and 120, discussed above with respect to method 100. In other words, at operation 212, the monitoring system can isolate a particular layer of the build image and register the build image. The monitoring system can then use the registered build image to reconstruct a 3D build model and use the 3D build model to encode a 3D build model surface. The 3D build model and 3D build model surface represent the 3D object that is actually being built in contrast to the idealized version of the 3D object to be built. As described in further detail below, the 3D build model and 3D build model surface generated at operation 212 can be compared with the 3D model and 3D model surface generated at operations 116 and 120, to determine to what extent the 3D object that is actually being built matches the idealized version of the 3D object to be built.

At operation 216, the monitoring system determines whether the particular layer of the build image matches the particular layer of the initial image. Operation 216 ensures that the monitoring system is comparing the particular layer of the 3D object that is being built with the corresponding particular layer of the 3D object to be built. If the monitoring system determines that the particular layer of the 3D object that is being built does not match the particular layer of the 3D object to be built, the method 200 returns to operation 208 and repeats operations 208, 212, and 216 until the particular layer of the 3D object that is being built matches the particular layer of the 3D object to be built.

If the monitoring system determines that the particular layer of the 3D object that is being built matches the particular layer of the 3D object to be built, the method 200 proceeds with operation 220, wherein the monitoring component of the monitoring system is activated. The monitoring component can include software components such as, for example, an AI algorithm, which is configured for use with the monitoring system. Once activated, the monitoring component monitors the printing process.

At operation 224, the monitoring system notifies an operator or user who is operating or using the 3D printing system of an anomaly that arises in the printing process. In other words, at operation 224, the monitoring component detects an anomaly between the object model and the 3D build model and notifies the operator or user of the anomaly. Further details pertaining to the performance of operations 220 and 224 according to at least one example embodiment of the present disclosure are set forth below.

Figure 3:
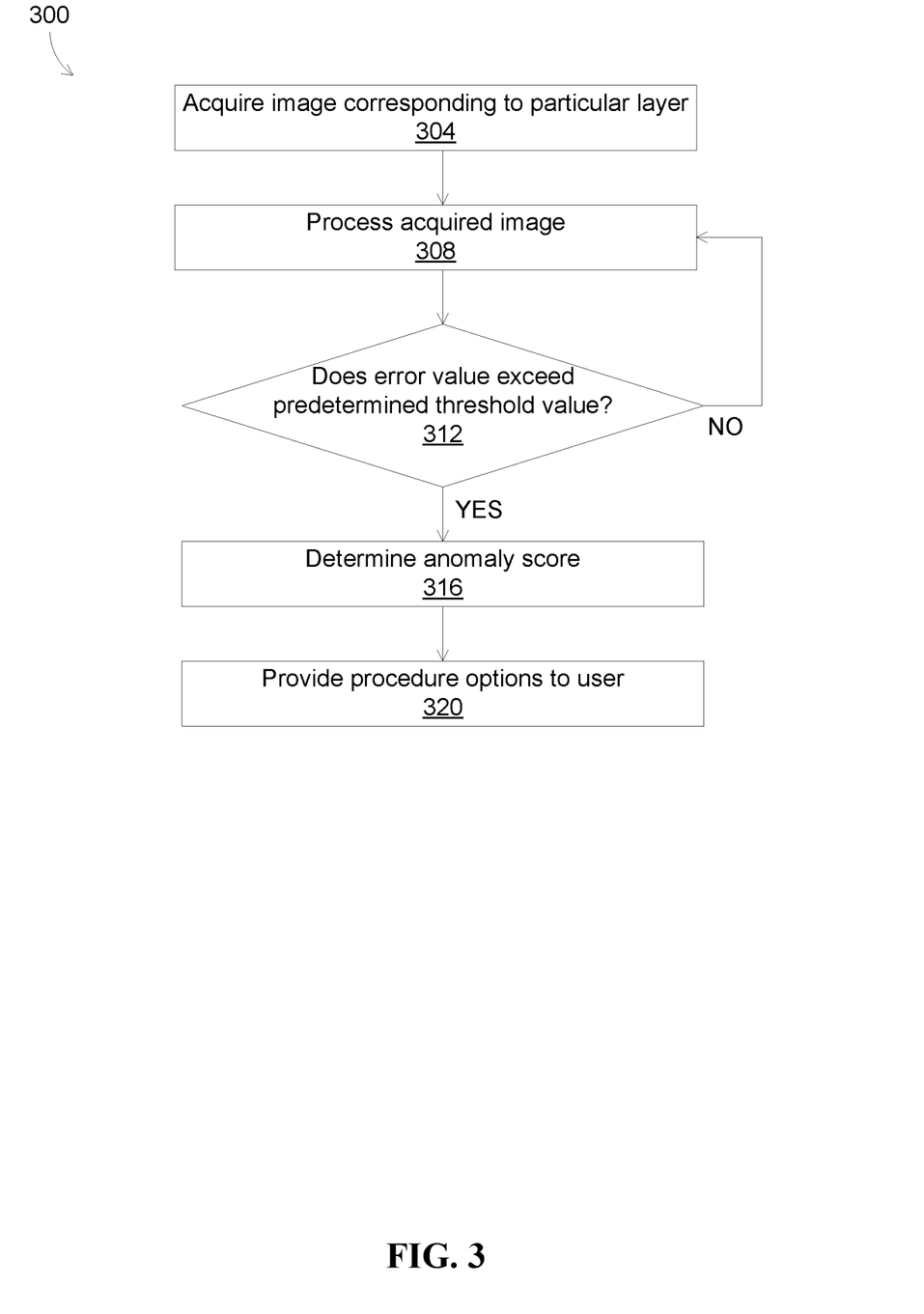
FIG. 3 illustrates a flowchart of an example method for detecting an anomaly in an additive manufacturing process and determining whether or how to proceed with the additive manufacturing process in light of the detected anomaly, in accordance with embodiments of the present disclosure.

FIG. 3 depicts an example method 300 of the present disclosure for detecting an anomaly in an additive manufacturing process and determining whether or how to proceed with the additive manufacturing process in light of the detected anomaly. As noted above, the present example is described in the context of a 3D printing process but can also be utilized in the context of other additive manufacturing processes.

At operation 304 of method 300, an image is acquired that corresponds to a particular printed layer. More specifically, the monitoring system acquires an image that corresponds to a particular printed layer. The monitoring system can use the image to compare the 3D object that is actually being printed with the idealized version of the 3D object to be printed.

More specifically, at operation 308, the acquired image is processed by the monitoring component. According to at least one embodiment of the present disclosure, processing the acquired image includes applying AI algorithms of the monitoring component to the image. In at least one embodiment of the present disclosure, the AI algorithms include an autoencoder, which is configured to encode and/or decode information corresponding to the acquired image.

According to at least one embodiment of the present disclosure, the autoencoder includes an encoder network, which is configured to perform nonlinear dimensionality reduction to transform the input image into a lower-dimension latent representation. The autoencoder further includes a decoder network, which is configured to reconstruct the original layer or layer image from this latent representation.

In at least one embodiment of the present disclosure, the encoder network automatically performs operation substantially similar to operations 108, 112, and 116, discussed above with reference to method 100. In at least one embodiment of the present disclosure, the decoder network automatically performs operations substantially similar to operation 120 discussed above with reference to method 100.

Accordingly, at operation 308, the monitoring component applies the encoder network and the decoder network to automatically extract features from acquired images and reconstruct an object model. In at least one embodiment of the present disclosure, the performance of operation 308 provides a model that can be generalized to the reconstruction of object models similar to those in a training set.

At operation 312, the reconstructed object model is compared to an initial object model. Any deviation between the reconstructed object model and the initial object model is assigned an error value. For example, the error value may represent a percentage of pixels of the reconstructed object model that deviate from the pixels of the initial object model. For example, if 12% of the pixels of the reconstructed object model deviate from the pixels of the initial object model, the deviation may be assigned an error value of 12.

If the error value does not exceed a predetermined threshold value, this indicates that a deviation between the reconstructed object model and the initial object model is not significant enough to be reported to the user or operator, and the method 300 returns to operation 308.

Conversely, if the error value does exceed a predetermined threshold value, this indicates that the deviation between the reconstructed object model and the initial object model is significant enough to be reported to the user or operator, and the method 300 proceeds with operation 316. In other words, if the error value exceeds the predetermined threshold value, this indicates that the printing process has failed to create the idealized 3D object according to the initial object model. By reporting this failure to the user or operator, the user or operator can determine whether the failure is significant enough to take subsequent action.

In some embodiments, the predetermined threshold value may be set by a user or automatically determined by the monitoring system. The predetermined threshold value may be based on one or more factors that affect the usability of the resulting 3D object. For example, the predetermined threshold may be based on the complexity of the 3D object, the materials used to create the 3D object (e.g., brittle materials may have lower tolerances than ductile materials), the function of the 3D object (e.g., a load-bearing object may be less tolerant to defects than a non-load-bearing object), whether the defect is internal or external (e.g., visible), whether the location of the defect substantially weakens the 3D object, and/or an importance of the 3D object (e.g., a failure tolerance for the 3D object), among other factors as would be recognized by persons of ordinary skill.

At operation 316, the monitoring system determines an anomaly score for the deviation. In at least one embodiment of the present disclosure, the anomaly score may be the error value. In another embodiment of the present disclosure, the anomaly score may be generated using the error value. The anomaly score may indicate greater detail about the discrepancy to the user or operator. Accordingly, at operation 320, the monitoring system provides an indication to the user or operator on whether or how to proceed with the printing process.

More specifically, the anomaly score may indicate to the user or operator what subsequent action should be taken. Additionally, or alternatively, the anomaly score may correspond to a set of possible subsequent actions from which the user or operator can choose. For example, an anomaly score of 12 may correspond to an indication that the discrepancy between the 3D object and the object model is too great to continue with construction of the 3D object. Alternatively, an anomaly score of 12 may correspond to an indication that construction of the 3D object may continue if parameters of 3D object construction are modified.

At operation 320, the monitoring system provides procedure for the printing process to the user or operator that correspond to the anomaly score. The user or operator can thus make real-time decisions about whether or how to proceed with the printing process in light of detected anomalies on a layer-by-layer basis as the 3D object is being constructed.

In at least one embodiment of the present disclosure, the reconstructed object model and the initial object model can be provided to a user via an augmented reality or mixed reality device. Accordingly, the user or operator can view discrepancies detected by the monitoring system. Additionally, or alternatively, this may enable the user or operator to independently detect discrepancies between the reconstructed object model and the initial object model. Additionally, or alternatively, this may aid the user or operator in determining which, if any, subsequent action to take in response to the detection of a discrepancy.

Additionally, this allows a user or operator to perform such actions without necessarily being present at the site where the 3D object is being constructed. In some embodiments, the user or operator may be present at the site where the 3D object is being constructed and view discrepancies overlaid on the 3D object as it is being constructed. In some embodiments, the user or operator may be located remotely from the site where the 3D object is being constructed and view the discrepancies in the context of viewing both the 3D object model and the initial object model.

Figure 4:
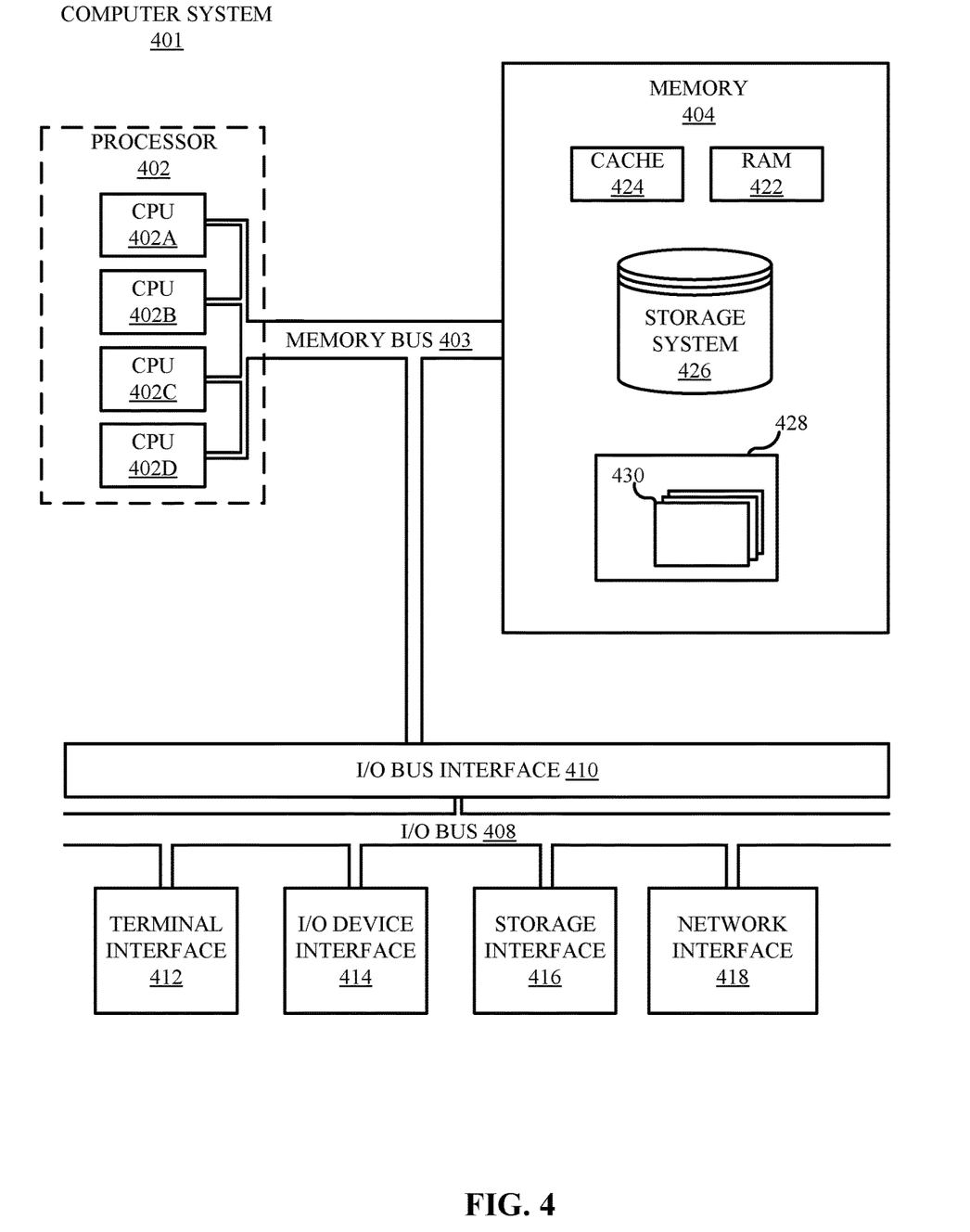
FIG. 4 illustrates a high-level block diagram of an example computer system that may be used in implementing one or more of the methods, tools, and modules, and any related functions, described herein, in accordance with embodiments of the present disclosure.

Referring now to FIG. 4, shown is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
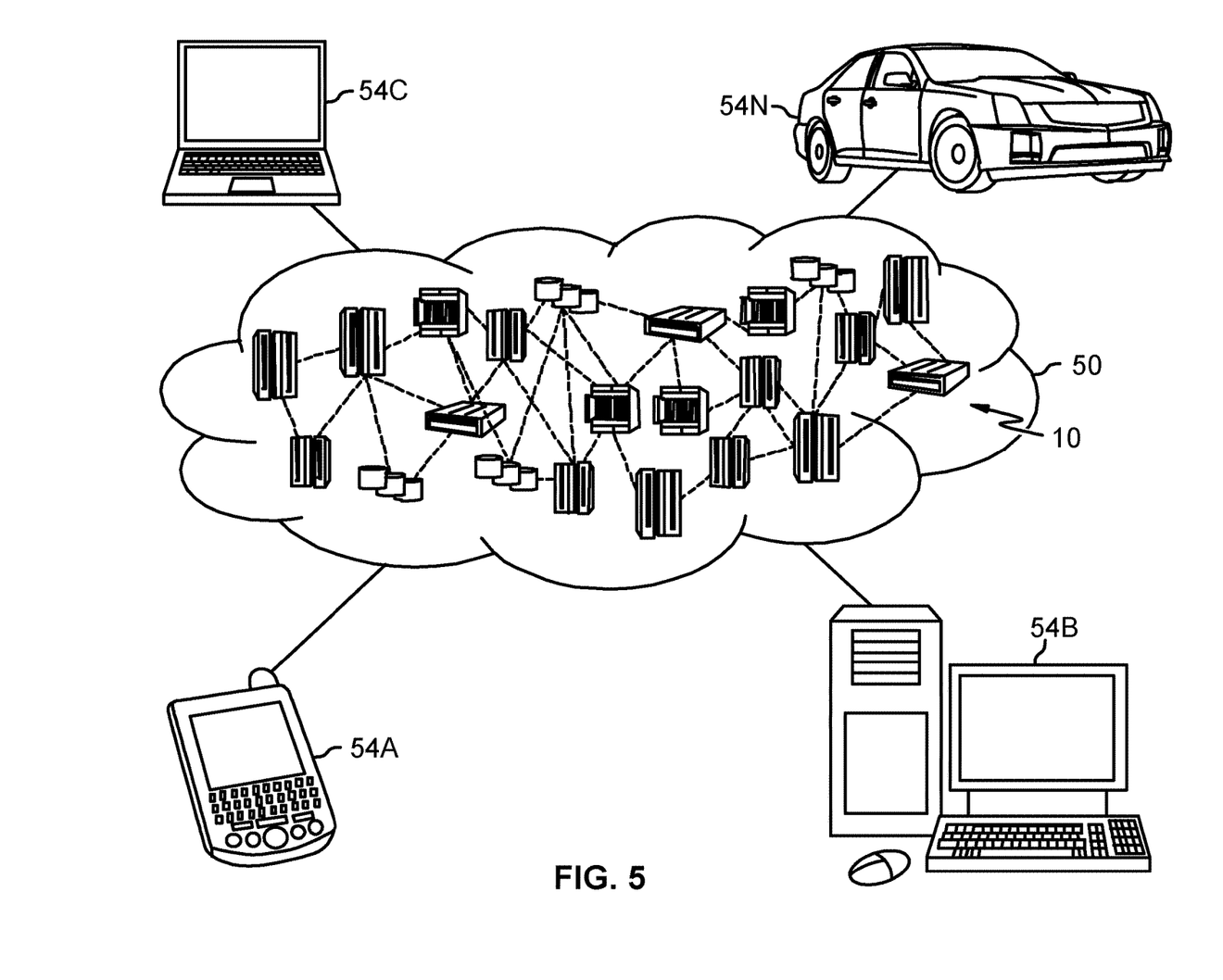
FIG. 5 depicts a cloud computing environment, in accordance with embodiments of the present disclosure.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
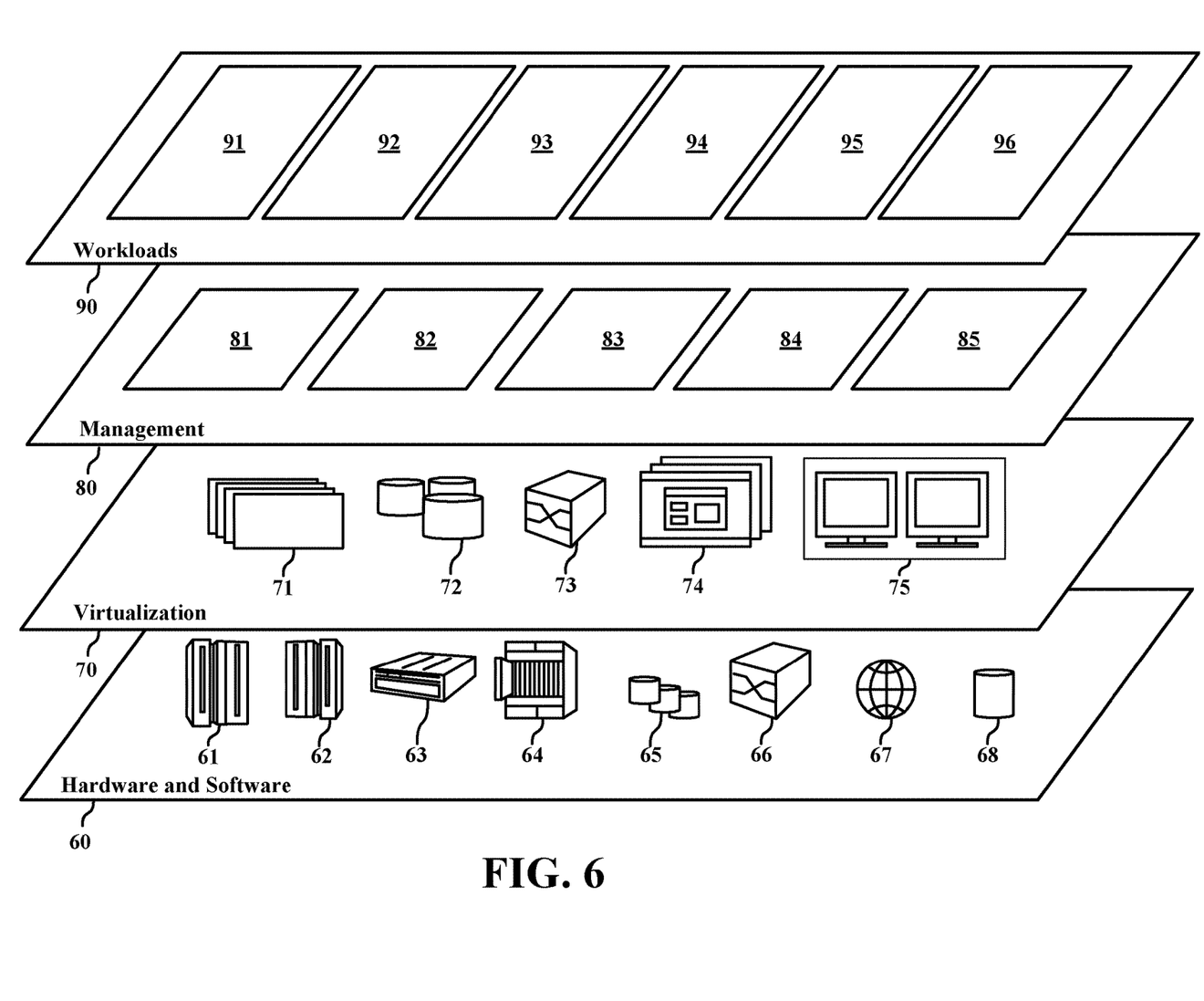
FIG. 6 depicts abstraction model layers, in accordance with embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

In addition to embodiments described above, other embodiments having fewer operational steps, more operational steps, or different operational steps are contemplated. Also, some embodiments may perform some or all of the above operational steps in a different order. Furthermore, multiple operations may occur at the same time or as an internal part of a larger process. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method for additive manufacturing, the method comprising:
   acquiring a two-dimensional image and an object model of a three-dimensional object that is to be constructed;
   generating a three-dimensional model using the two-dimensional image and the object model;
   responsive to constructing a current layer of the three-dimensional object, and prior to constructing a subsequent layer, capturing a build image of the current layer;
   generating a three-dimensional build model comprising the build image of the current layer;
   comparing the three-dimensional model with the three-dimensional build model with respect to the current layer;
   identifying a discrepancy between the three-dimensional model and the three-dimensional build model based on the comparison;
   providing a notification of the identified discrepancy, the notification including a recommendation for modifying construction of the three-dimensional object based on the identified discrepancy; and
   adjusting parameters of the additive manufacturing based on the recommendation.

2. The method of claim 1, wherein comparing the three-dimensional model with the object model includes generating a visualization of the three-dimensional model and the object model using augmented reality.

3. The method of claim 1, wherein acquiring the image of the three-dimensional object includes acquiring the image of the three-dimensional object at an intermediary stage of construction of the three-dimensional object.

4. The method of claim 1, wherein acquiring the image of the three-dimensional object includes acquiring a top plan view image of the three-dimensional object.

5. The method of claim 1, further comprising:
   assigning a score to the discrepancy based on an amount of deviation between the three-dimensional model and the object model; and
   comparing the score with a predetermined threshold to determine whether to cease construction of the three-dimensional object.

6. The method of claim 1, wherein generating the three-dimensional model includes generating depth data from the layer.

7. The method of claim 1, wherein generating the three-dimensional model includes:
   dividing the layer into a plurality of distinct portions; and
   encoding a surface depth of each distinct portion.

8. The method of claim 1, wherein aligning the mask with the acquired image includes performing at least one transformation of the acquired image to account for at least one aspect of a context of the acquired image.

9. The method of claim 1, wherein information that corresponds to the registered image is determined from information that corresponds to the acquired image by aligning the mask with the acquired image.

10. A computer program product comprising a computer readable storage medium having program instructions embodied therewith, the program instructions executable by processor to cause the processor to perform a method for additive manufacturing, the method comprising:
    acquiring a two-dimensional image and an object model of a three-dimensional object that is to be constructed;
    generating a three-dimensional model using the two-dimensional image and the object model;
    responsive to constructing a current layer of the three-dimensional object, and prior to constructing a subsequent layer, capturing a build image of the current layer;
    generating a three-dimensional build model comprising the build image of the current layer;
    comparing the three-dimensional model with the three-dimensional build model with respect to the current layer;
    identifying a discrepancy between the three-dimensional model and the three-dimensional build model based on the comparison;
    providing a notification of the identified discrepancy, the notification including a recommendation for modifying construction of the three-dimensional object based on the identified discrepancy; and
    adjusting parameters of the additive manufacturing based on the recommendation.

11. The computer program product of claim 10, wherein comparing the three-dimensional model with the object model includes generating a visualization of the three-dimensional model and the object model using augmented reality.

12. The computer program product of claim 10, wherein acquiring the image of the three-dimensional object includes acquiring the image of the three-dimensional object at an intermediary stage of construction of the three-dimensional object.

13. The computer program product of claim 10, wherein acquiring the image of the three-dimensional object includes acquiring a top plan view image of the three-dimensional object.

14. The computer program product of claim 10, wherein the method further comprises:

assigning a score to the discrepancy based on an amount of deviation between the three-dimensional model and the object model; and comparing the score with a predetermined threshold to determine whether to cease construction of the three-dimensional object.

15. The computer program product of claim 10, wherein generating the three-dimensional model includes generating depth data from the layer.

16. The computer program product of claim 10, wherein generating the three-dimensional model includes:

dividing the layer into a plurality of distinct portions; and encoding a surface depth of each distinct portion.

17. An additive manufacturing monitoring system comprising:

a memory; and a processor communicatively coupled to the memory, wherein the processor is configured to perform a method comprising:

acquiring a two-dimensional image and an object model of a three-dimensional object that is to be constructed;

generating a three-dimensional model using the two-dimensional image and the object model;

responsive to constructing a current layer of the three-dimensional object, and prior to constructing a subsequent layer, capturing a build image of the current layer;

generating a three-dimensional build model comprising the build image of the current layer;

comparing the three-dimensional model with the three-dimensional build model with respect to the current layer;

identifying a discrepancy between the three-dimensional model and the three-dimensional build model based on the comparison;

providing a notification of the identified discrepancy, the notification including a recommendation for modifying construction of the three-dimensional object based on the identified discrepancy; and adjusting parameters of the additive manufacturing based on the recommendation.

18. The additive manufacturing monitoring system of claim 17, wherein comparing the three-dimensional model with the object model includes generating a visualization of the three-dimensional model and the object model using augmented reality.

19. The additive manufacturing monitoring system of claim 17, wherein acquiring the image of the three-dimensional object includes acquiring the image of the three-dimensional object at an intermediary stage of construction of the three-dimensional object.

20. The additive manufacturing monitoring system of claim 17, wherein generating a three-dimensional model includes generating depth data from the layer.

* * * * *